US012578732B2

(12) United States Patent
Inoue et al.

(10) Patent No.: US 12,578,732 B2
(45) Date of Patent: Mar. 17, 2026

(54) CONTROL DEVICE, MOVING OBJECT, AND CONTROL METHOD

(71) Applicant: TOYOTA JIDOSHA KABUSHIKI KAISHA, Toyota (JP)

(72) Inventors: Go Inoue, Gotemba (JP); Noritsugu Iwazaki, Shizuoka-ken (JP); Yoshinori Watanabe, Isehara (JP); Takeshi Kanou, Seto (JP); Yuki Okamoto, Kanagawa-ken (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 18/666,966

(22) Filed: May 17, 2024

(65) Prior Publication Data

US 2024/0402723 A1     Dec. 5, 2024

(30) Foreign Application Priority Data

May 31, 2023    (JP) ................................. 2023-089963
Jan. 17, 2024    (JP) ................................. 2024-005278

(51) Int. Cl.
G05D 1/244        (2024.01)
G05D 1/249        (2024.01)
G05D 107/70        (2024.01)

(52) U.S. Cl.
CPC ........... G05D 1/2446 (2024.01); G05D 1/249 (2024.01); *G05D 2107/70* (2024.01)

(58) Field of Classification Search
CPC ...... G05D 1/2446; G05D 1/249; G05D 1/225; G05D 1/247; G05D 1/43; G05D 2107/70;
(Continued)

(56) References Cited

U.S. PATENT DOCUMENTS

| 10,532,771 | B2 | 1/2020 | Nordbruch | |
| 2018/0143638 | A1* | 5/2018 | Walton | ................. G05D 1/0223 |

(Continued)

FOREIGN PATENT DOCUMENTS

| CN | 111506071 | A | * | 8/2020 | ............. G01C 21/28 |
| CN | 115237158 | A | * | 10/2022 | ............. G05D 1/101 |

(Continued)

OTHER PUBLICATIONS

Ang et al.; Location Sensing using QR codes via 2D camera for Automated Guided Vehicles; 2020 IEEE Sensors Applications Symposium (SAS), Kuala Lumpur, Malaysia, 2020, pp. 1-6 (Year: 2020).*

(Continued)

*Primary Examiner* — Michael J Zanelli
(74) *Attorney, Agent, or Firm* — Sughrue Mion, PLLC

(57)        ABSTRACT

A control device includes: an acquisition unit configured to acquire a detection result by a detector, wherein the detector is mounted on a moving object movable by unmanned driving; a determination unit configured to determine a landmark to be detected by the detector, wherein the landmark is located outside the moving object; and a control unit configured to move the moving object by unmanned driving, wherein the control unit performs different processing for moving the moving object depending on whether or not the landmark determined by the determination unit is included in the detection result.

7 Claims, 16 Drawing Sheets

(58) Field of Classification Search
CPC .......... G05D 2105/45; G05D 2109/10; G05D
2111/10
See application file for complete search history.

(56) References Cited

U.S. PATENT DOCUMENTS

| | | | | |
|---|---|---|---|---|
| 2020/0005057 A1* | 1/2020 | Xiang | .................. | G06V 20/584 |
| 2021/0397180 A1* | 12/2021 | Thomas | ............... | G05D 1/0297 |
| 2022/0073108 A1* | 3/2022 | Park | ...................... | B60W 30/16 |
| 2022/0236739 A1* | 7/2022 | Bidram | ............... | G05D 1/0094 |

FOREIGN PATENT DOCUMENTS

| | | | | | |
|---|---|---|---|---|---|
| EP | 3 705 971 | A1 | 9/2020 | | |
| EP | 4 141 606 | A1 | 3/2023 | | |
| KR | 20210115128 | A * | 9/2021 | ........... | G01S 17/931 |
| WO | WO-2022226529 | A1 * | 10/2022 | ......... | G01C 21/3841 |

OTHER PUBLICATIONS

Debnath et al.; Designing a Rapid Optical Response Trigger(RORT) for self-navigating and path explorer robot; International Conference on Computational Intelligence and Data Science (ICCIDS 2019); Procedia Computer Science 167 (2020) 1543-1552 (Year: 2019).*

Barayyan; IR Coding Design and Implementation for Autonomous In-door Mobile Robot Localization; 2015 5th National Symposium on Information Technology: Towards New Smart World (NSITNSW), Riyadh, Saudi Arabia, 2015, pp. 1-5 (Year: 2015).*

* cited by examiner

400
STEP MANAGEMENT DEVICE

500
EXTERNAL SENSOR

300
NOTIFICATION DEVICE

1

CONTROL DEVICE, MOVING OBJECT, AND CONTROL METHOD

CROSS REFERENCE TO RELATED APPLICATIONS

The patent application claims the priority based on Japanese Patent Applications No. 2023-089963 filed on May 31, 2023, and No. 2024-005278 filed on Jan. 17, 2024, the disclosure of which are hereby incorporated by reference in their entireties.

BACKGROUND

Field

The present disclosure relates to a control device, a moving object, and a control method.

A technique has been known, which transmits a command to move a wiper or the like of a vehicle by remote control and observes whether or not the wiper or the like of the vehicle moves in accordance with the command, thereby confirming whether or not an intended vehicle is being controlled (for example, U.S. Pat. No. 10,532,771 B2).

In the above-mentioned technique, there is a possibility of an error in determination of whether or not an intended target is being controlled when a target vehicle and a non-target vehicle perform the same operation in the same period of time.

SUMMARY

The present disclosure can be implemented according to the following aspects.

(1) According to a first aspect of the present disclosure, a control device is provided. This control device includes: an acquisition unit configured to acquire a detection result by a detector, wherein the detector is mounted on a moving object movable by unmanned driving; a determination unit configured to determine a landmark to be detected by the detector, wherein the landmark is located outside the moving object; and a control unit configured to move the moving object by unmanned driving, wherein the control unit performs different processing for moving the moving object depending on whether or not the landmark determined by the determination unit is included in the detection result.

According to the control device of this aspect, it is possible to prevent an error in determination of whether or not an intended target is being controlled.

(2) In the control device of the above aspect, when the landmark determined by the determination unit is not included in the detection result, the control unit may execute at least one of a process of notifying occurrence of abnormality, a process of changing a speed of the moving object, and a process of stopping unmanned driving for the moving object.

According to the control device of this aspect, it is possible to prevent moving an unintended moving object.

(3) In the control device of the above aspect, the detector may be a camera and the landmark may be a two-dimensional code.

According to the control device of this aspect, it is possible to use a detection result of the two-dimensional code by the camera to determine whether or not an intended target is being controlled.

(4) In the control device of the above aspect, the determination unit may determine the landmark to be detected by the detector using position information used as information indicative of a position of the moving object and position information indicative of a position of the landmark.

According to the control device of this aspect, it is possible to accurately estimate the landmark to be detected by the detector.

(5) In the control device of the above aspect, the landmark may be a projection image projected by a projection device located outside the moving object, and the control device may further include a projection control unit that controls the projection device.

According to the control device of this aspect, the projection image projected by the projection device can be used as the landmark.

(6) In the control device of the above aspect, the determination unit may determine the landmark to be detected by the detector and a direction of the landmark to be detected by the detector with respect to the moving body, and the control unit may perform different processing for moving the moving object when the landmark determined by the determination unit is included in the detection result, depending on whether or not the landmark included in the detection result is located in the direction determined by the determination unit.

According to the control device of this aspect, it is possible to more accurately determine whether or not an intended target is being controlled.

(7) According to a second aspect of the present disclosure, a moving object movable by unmanned driving is provided. This moving object includes: a detector configured to detect a landmark located outside the moving object; an acquisition unit configured to acquire information regarding the landmark to be detected by the detector determined by a remote control device, the remote control device controlling the moving object from outside the moving object; and a control unit configured to moves the moving object in accordance with a command transmitted from the remote control device, the control unit performing different processing for moving the moving object depending on whether or not the landmark determined by the remote control device is included in a detection result by the detector.

According to the moving object of this aspect, it is possible to prevent an error in determination of whether or not an intended target is being controlled.

(8) According to a third aspect of the present disclosure, a moving object movable by unmanned driving is provided. This moving object includes: a detector configured to detect a landmark located outside the moving object; a determination unit configured to determine the landmark to be detected by the detector; and a control unit configured to moves the moving object by unmanned driving, the control unit performing different processing for moving the moving object depending on whether or not the landmark determined by the determination unit is included in a detection result by the detector.

According to the moving object of this aspect, it is possible to prevent an error in determination of whether or not an intended target is being controlled.

(9) According to a fourth aspect of the present disclosure, a control method is provided. This control method includes: acquiring a detection result by a detector, wherein the detector is mounted on a moving object movable by unmanned driving; determining the landmark to be detected by the detector, wherein the wherein the landmark is located outside the moving object; and performing different processing for moving the moving object depending on whether or not the landmark determined by the determining is included in the detection result.

According to the control method of this aspect, it is possible to prevent an error in determination of whether or not an intended target is being controlled.

The present disclosure can also be realized in various forms other than the control device, the moving object, and the control method. For example, it can be realized in forms of an unmanned driving system, a computer program, and a recording medium on which the computer program is recorded, or the like.

BRIEF DESCRIPTION OF THE DRAWINGS

FIG. 12 is an illustrative diagram illustrating a configuration of an unmanned driving system in a fourth embodiment;

DETAILED DESCRIPTION

A. First Embodiment

Figure 1:
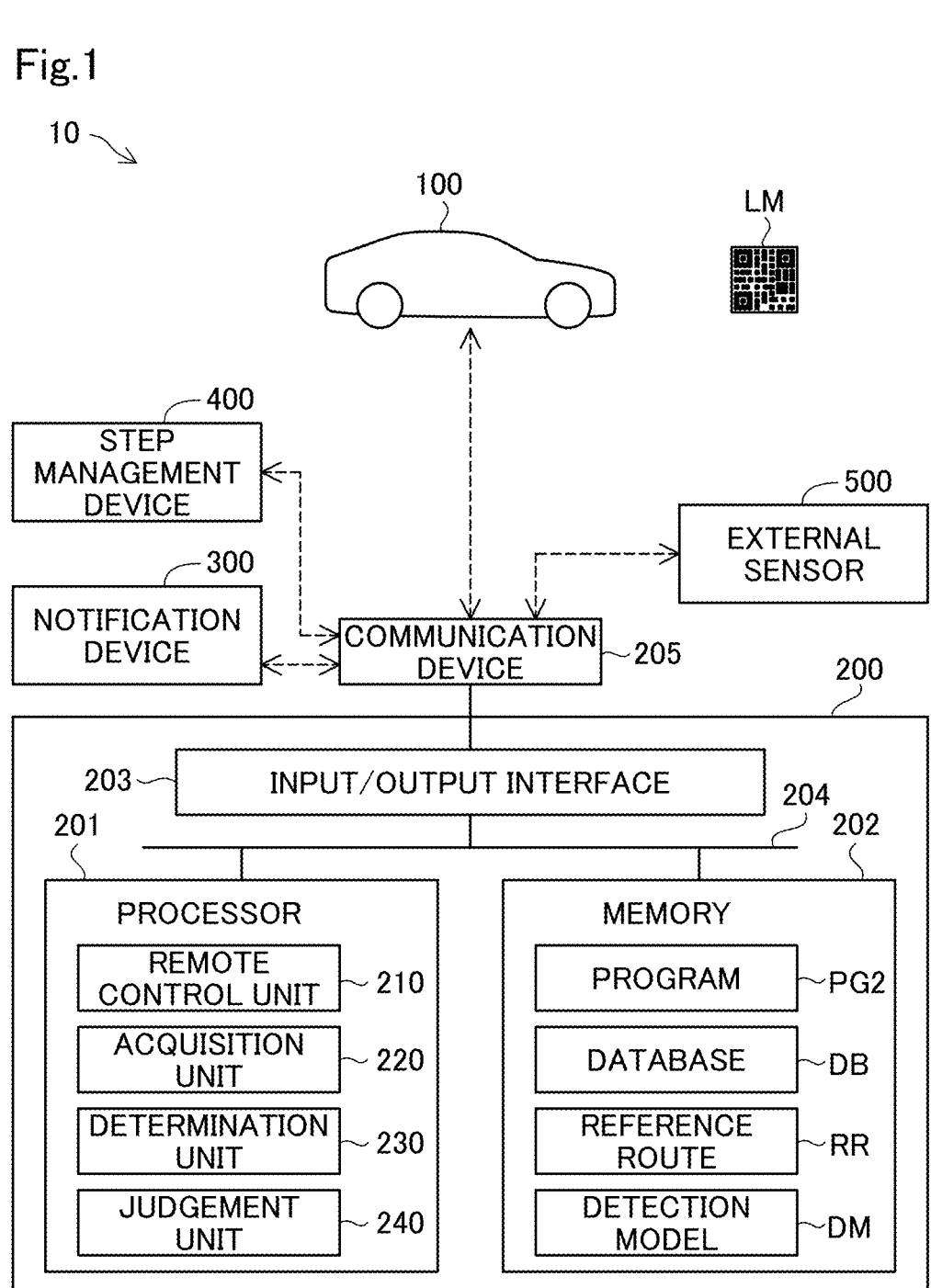
FIG. 1 is an illustrative diagram illustrating a configuration of an unmanned driving system in a first embodiment.
Figure 2:
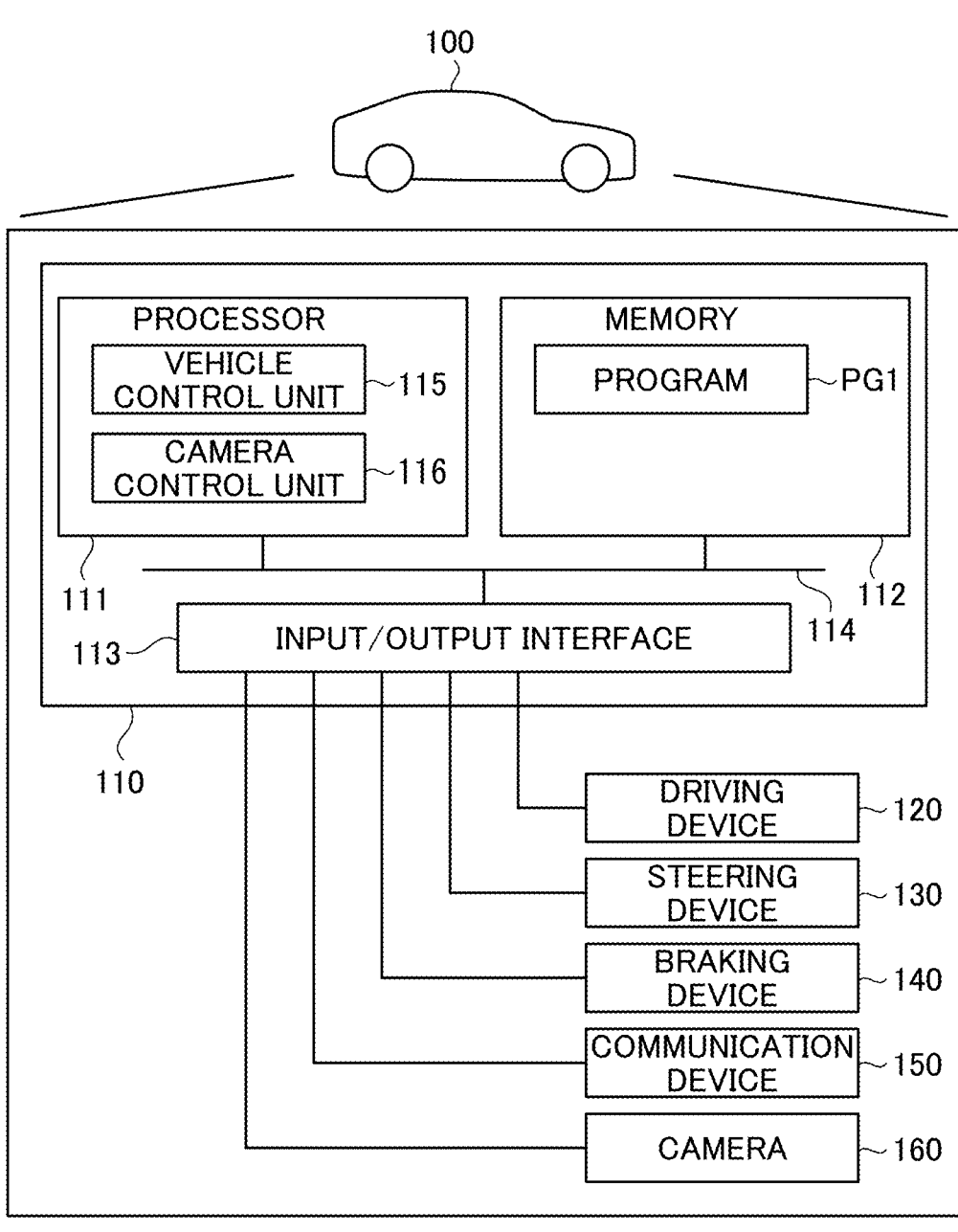
FIG. 2 is an illustrative diagram illustrating a configuration of a vehicle in the first embodiment.

FIG. 1 is an illustrative diagram illustrating a configuration of an unmanned driving system 10 in a first embodiment. FIG. 2 is an illustrative diagram illustrating a configuration of a vehicle 100 in the first embodiment. The unmanned driving system 10 is used for moving a moving object by unmanned driving. In the present embodiment, the unmanned driving system 10 is used in a factory where the moving object is produced to move the moving object by unmanned driving. Note that the unmanned driving system 10 may be used not in the factory where the moving object is produced, but in a commercial facility, a university, a park, or the like, for example, to move the moving object by unmanned driving.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

As shown in FIG. 1, in the present embodiment, the unmanned driving system 10 includes at least one vehicle 100, a remote control device 200 that remotely controls the vehicle 100, a notification device 300 to notify occurrence of abnormality in the factory, a step management device 400 to manage manufacturing steps of the vehicle 100 in the factory, and at least one external sensor 500. Note that the remote control device 200 may be simply referred to as a control device. In the present embodiment, the remote control device 200 corresponds to the "control device" of the present disclosure.

As shown in FIG. 2, in the present embodiment, the vehicle 100 is an electric vehicle configured to be movable by remote control. The vehicle 100 includes a vehicle control device 110 to control each section of the vehicle 100, a driving device 120 to accelerate the vehicle 100, a steering device 130 to change a traveling direction of the vehicle 100, a braking device 140 to decelerate the vehicle 100, a communication device 150 to wirelessly communicate with the remote control device 200, and a camera 160 to detect a landmark LM located outside the vehicle 100. The driving device 120 includes a battery, a motor driven by a power of the battery, and a driving wheel rotated by the motor. Note that the camera 160 may be referred to as a detector.

The vehicle control device 110 is configured with a computer equipped with a processor 111, a memory 112, an input/output interface 113, and an internal bus 114. The processor 111, the memory 112, and the input/output interface 113 are connected through the internal bus 114 such that they can bidirectionally communicate with each other. The input/output interface 113 is connected with the driving device 120, the steering device 130, the braking device 140, the communication device 150, and the camera 160. The memory 112 stores a computer program PG1.

The processor 111 executes the computer program PG1, thereby functioning as a vehicle control unit 115 and a camera control unit 116. The vehicle control unit 115 controls the driving device 120, the steering device 130, and the braking device 140. When a driver is in the vehicle 100, the vehicle control unit 115 can run the vehicle 100 by controlling the driving device 120, the steering device 130, and the braking device 140 in response to operation by the driver. The vehicle control unit 115 can run the vehicle 100 by controlling the driving device 120, the steering device 130, and the braking device 140 in accordance with a remote control command supplied from the remote control device 200 regardless of whether or not the driver is in the vehicle 100. The camera control unit 116 controls the camera 160. The camera control unit 116 performs detection of the landmark LM by the camera 160 and transmits a detection result of the landmark LM to the remote control device 200.

As shown in FIG. 1, the remote control device 200 is configured with a computer equipped with a processor 201, a memory 202, an input/output interface 203, and an internal bus 204. The processor 201, the memory 202, and the input/output interface 203 are connected through the internal bus 204 such that they can bidirectionally communicate with each other. The input/output interface 203 is connected with a communication device 205 to wirelessly communicate with the vehicle 100. In the present embodiment, the communication device 205 can also communicate with the notification device 300, the step management device 400, and the external sensor 500 via wired or wireless communication. The memory 202 stores a computer program PG2 and a database DB.

Recorded in the database DB is information regarding the landmark LM inside the factory. In the present embodiment, the landmark LM is a two-dimensional code attached to equipment inside the factory. More specifically, the landmark LM is a QR code attached to the equipment inside the factory. Position information regarding the two-dimensional code and contents of the two-dimensional code are recorded in the database DB. Note that the landmark LM may be, for example, a two-dimensional code other than a QR code, such as DataMatrix and PDF417, or may be a barcode. The processor 201 executes the computer program PG2, thereby functioning as a remote control unit 210, an acquisition unit 220, a determination unit 230, and a judgement unit 240. The remote control unit 210 remotely controls the vehicle 100, thereby running the vehicle 100. The remote control unit 210 remotely controls the vehicle 100, thereby causing the camera 160 to detect the landmark LM and transmit the detection result of the landmark LM. The acquisition unit 220 acquires the detection result transmitted from the vehicle 100. The detection result by the camera 160 may be a video output from the camera 160. The video may be a still image or a moving image. The detection result by the camera 160 may be contents of a two-dimensional barcode that is read from the video output from the camera 160. The determination unit 230 determines the landmark LM to be detected by the camera 160. The judgement unit 240 determines whether or not the landmark LM to be detected by the camera 160 is included in the detection result by the camera 160. In a case that the detection result by the camera 160 is the video, the judgement unit 240 analyzes the video to determine whether or not the landmark LM to be detected is included in the detection result. In a case that the detection result by the camera 160 is the contents of the two-dimensional barcode, the judgement unit 240 compares the contents of the two-dimensional barcode to be detected with the detection result, thereby determining whether or not the landmark LM to be detected is included in the detection result. Note that the remote control unit 210 may be simply referred to as a control unit.

The notification device 300 is a device to notify an administrator of the unmanned driving system 10 or a factory worker that abnormality has occurred in the factory. In the following description, the administrator of the unmanned driving system 10 and the factory worker are referred to as the administrator and the like. The notification device 300 is, for example, a warning buzzer or a warning lamp provided in the factory. The notification device 300 may be a tablet terminal carried by the administrator and the like. The notification device 300 is equipped with a communication device (not shown), and can communicate with the remote control device 200 via wired or wireless communication.

The step management device 400 is a device to manage the manufacturing steps of the vehicle 100 in the factory. The step management device 400 is configured with a computer. The step management device 400 is equipped with a communication device (not shown), and can communicate with the remote control device 200 and a variety of equipment in the factory via wired or wireless communication. The step management device 400 manages, for example, information indicating when, where, by whom, on which vehicle 100, and what operation will be performed, and information indicating when, where, by whom, on which vehicle 100, and what operation has been performed.

The external sensor 500 is a sensor arranged outside the vehicle 100. The external sensor 500 is used for detecting a position and orientation of the vehicle 100. In the present embodiment, the external sensor 500 is a camera installed in the factory. The external sensor 500 is equipped with a communication device (not shown) and communicates with the remote control device 200 via wired or wireless communication.

Figure 3A:
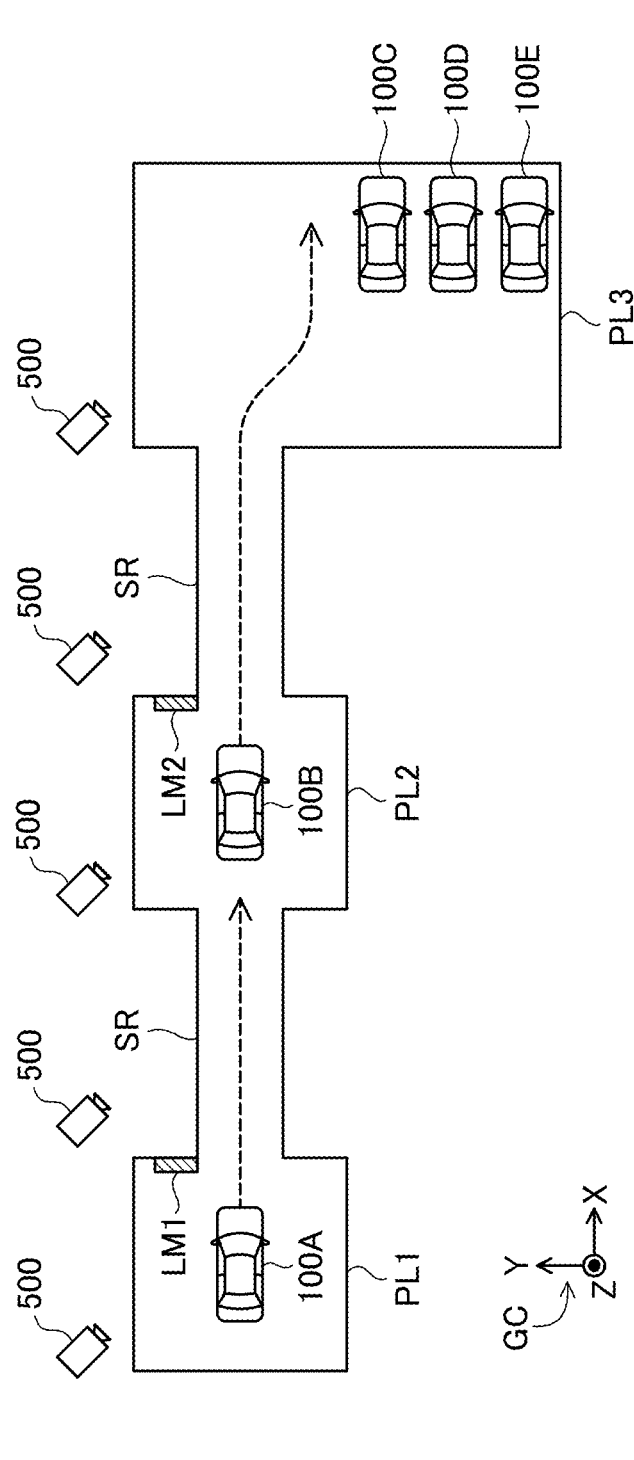
FIG. 3A is an illustrative diagram illustrating how a vehicle is moved by remote control in a factory.

FIG. 3A is an illustrative diagram illustrating how the vehicle 100 is moved by remote control in a factory KJ. FIG. 3A illustrates five vehicles 100A to 100E. In the following description, the five vehicles 100A to 100E are simply referred to as the vehicle 100 in a case of describing without particularly distinguishing between them. In the present embodiment, the factory KJ includes a first place PL1 where the vehicle 100 is assembled, a second place PL2 where the vehicle 100 is inspected, and a third place PL3 where the vehicle 100, that has passed the inspection, is stored. The first place PL1, the second place PL2, and the third place PL3 are connected by a track SR on which the vehicle 100 can run.

The first place PL1 is provided with a landmark LM1 and the second place PL2 is provided with a landmark LM2. As described above, in the present embodiment, each of the landmarks LM1, LM2 is a two-dimensional code. The contents of the two-dimensional code as the landmark LM1 are different from the contents of the two-dimensional code as the landmark LM2. In the following description, the landmark LM1 and the landmark LM2 are simply referred to as the landmark LM in a case of describing without particularly distinguishing between them.

The vehicle 100 assembled in the first place PL1 are equipped with the vehicle control device 110, the driving device 120, the steering device 130, the braking device 140, the communication device 150, and the camera 160. The vehicle 100 assembled in the first place PL1 runs from the first place PL1 to the second place PL2 by remote control by the remote control device 200. The vehicle 100 that has passed the inspection in the second place PL2 runs from the second place PL2 to the third place PL3 by remote control by the remote control device 200. Thereafter, the vehicle 100 is shipped from the factory KJ.

A method for moving the vehicle 100 by remote control by the remote control unit 210 will be described. The remote control unit 210 determines a target route for the vehicle 100 to run to a destination through the track SR. The target route herein refers to a reference route RR as described later. A plurality of external sensors 500 is installed around the track SR. In the present embodiment, the external sensor 500 is a camera. The remote control unit 210 can analyze a video captured by the camera as the external sensor 500, thereby acquiring a relative position and orientation of the vehicle 100 to the target route in real time. A given position in the factory KJ can be represented by X, Y, and Z coordinates in a global coordinate system GC. A position of the respective external sensor 500 is fixed. Relative relation between the global coordinate system GC and a device coordinate system for the respective external sensor 500 is known, and a coordinate transformation matrix to mutually transform coordinates between the global coordinate system GC and the device coordinate system for the respective external sensor 500 is also known. The remote control unit 210 generates a remote control command to run the vehicle 100 along the target route, and transmits the remote control command to the vehicle 100. The remote control command herein refers to a running control signal as described later. The vehicle control device 110 mounted on the vehicle 100 controls the driving device 120, the steering device 130, and the braking device 140 in accordance with the received remote control command, thereby running the vehicle 100. Accordingly, it is possible to move the vehicle 100 without using a transport device such as a crane and a conveyor. The remote control command specifies, for example, a target value of acceleration and a target value of a steering angle of the vehicle 100. Note that the remote control command may specify the target route of the vehicle 100. In this case, the vehicle control unit 115 may determine the target values of the acceleration and the steering angle of the vehicle 100 based on the target route. The remote control unit 210 can remotely control the plurality of vehicles 100A to 100E. Specifically, the remote control unit 210 generates the remote control command to remotely control each of the plurality of vehicles 100A to 100E. The remote control unit 210 transmits the remote control command corresponding to each of the plurality of vehicles 100A to 100E via the input/output interface 203 and the communication device 205 to each of the plurality of vehicles 100A to 100E. The remote control unit 210 may remotely control the plurality of vehicles 100A to 100E one by one in sequence or concurrently.

Figure 3B:
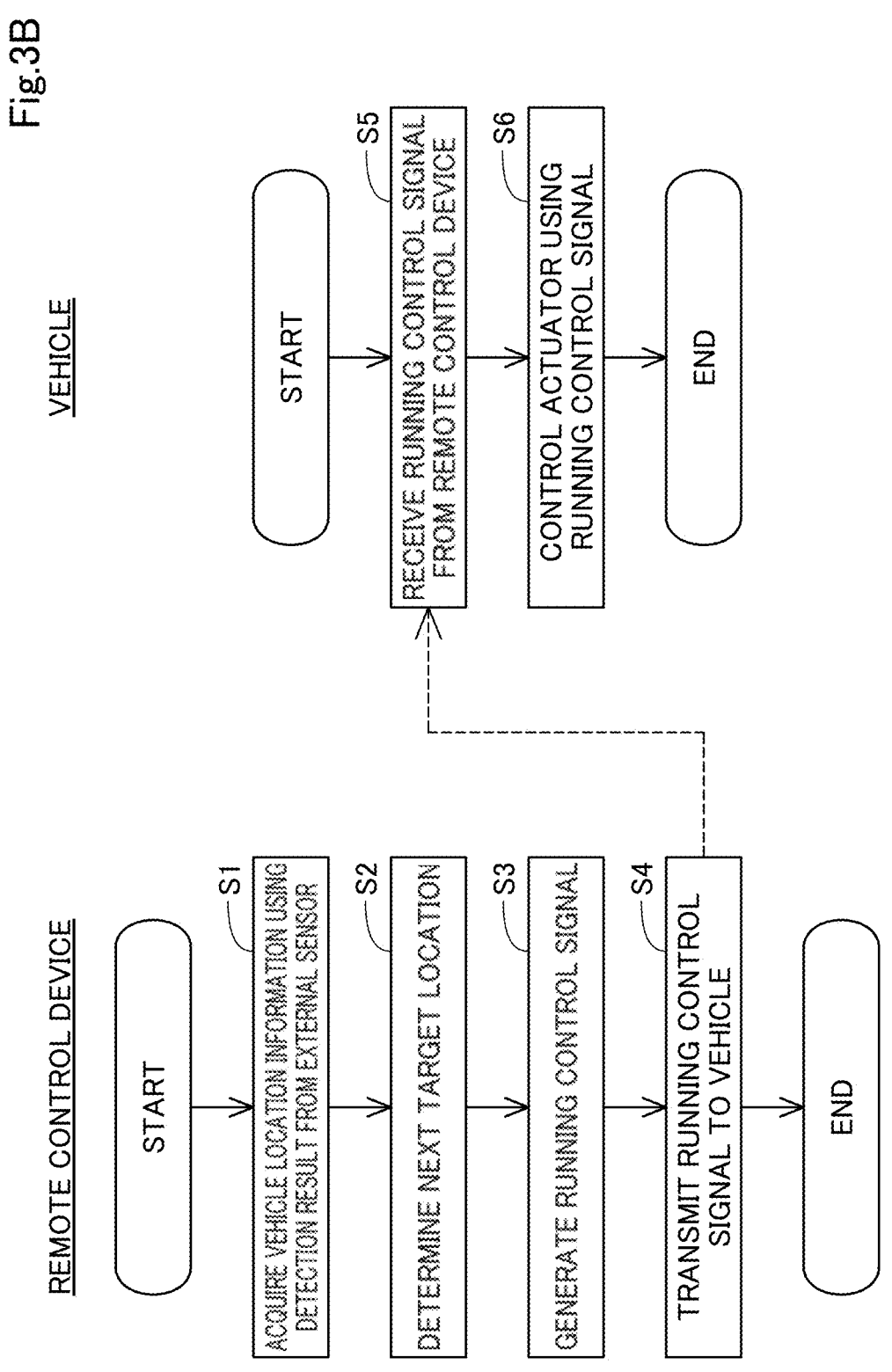
FIG. 3B is a flowchart illustrating a process procedure of running control of a vehicle in the first embodiment.

FIG. 3B is a flowchart illustrating a process procedure of running control of the vehicle 100 in the first embodiment. Step S1 to step S4 are repeatedly executed by the processor 201 of the remote control device 200, whereas step S5 to step S6 are repeatedly executed by the processor 111 of the vehicle control device 110. In the step S1, the remote control device 200 acquires vehicle location information of the vehicle 100 using detection results output from the external sensor 500, which is a sensor located outside the vehicle 100. The vehicle location information is position information that serves as the basis for generating running control signals. In the present embodiment, the vehicle location information includes the position and orientation of the vehicle 100 in the reference coordinate system of the factory KJ. In the present embodiment, the reference coordinate system of the factory KJ is the global coordinate system GC, and any location in the factory KJ is expressed with X, Y, and Z coordinates in the global coordinate system GC. In the present embodiment, the external sensor 500 is the camera, and the external sensor 500 outputs a captured image as a detection result. That is, in the step S1, the remote control device 200 acquires the vehicle location information using captured images acquired from the camera, which is the external sensor 500.

More specifically, in step S1, the remote control device 200 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system GC, thereby acquiring the location of the vehicle 100. The outer shape of the vehicle 100 in the captured image may be detected by inputting the captured image to a detection model using artificial intelligence, for example. The detection model is prepared in the unmanned driving system 10 or outside the unmanned driving system 10. The detection model is stored in advance in the memory 202 of the remote control device 200, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The remote control device 200 can acquire the orientation of the vehicle 100 through estimation based on the direction of a motion vector of the vehicle 100 detected from change in location of a feature point of the vehicle 100 between frames of the captured images using optical flow process, for example.

In step S2, the remote control device 200 determines a target location to which the vehicle 100 is to move next. In the present embodiment, the target location is expressed by X, Y, and Z coordinates in the global coordinate system GC. The memory 202 of the remote control device 200 contains the reference route RR stored in advance as a route along which the vehicle 100 is to run. The route is expressed by a node indicating a departure place, a node indicating a way point, a node indicating a destination, and a link connecting nodes to each other. The remote control device 200 determines the target location to which the vehicle 100 is to move next using the vehicle location information and the reference route RR. The remote control device 200 determines the target location on the reference route RR ahead of a current location of the vehicle 100.

In step S3, the remote control device 200 generates a running control signal for causing the vehicle 100 to run toward the determined target location. In the present embodiment, the running control signal includes an acceleration and a steering angle of the vehicle 100 as parameters. The remote control device 200 calculates a running speed of the vehicle 100 from transition of the location of the vehicle 100 and makes comparison between the calculated running speed and a target speed of the vehicle 100 determined in advance. If the running speed is lower than the target speed, the remote control device 200 generally determines an acceleration in such a manner as to accelerate the vehicle 100. If the running speed is higher than the target speed as, the remote control device 200 generally determines an acceleration in such a manner as to decelerate the vehicle 100. If the vehicle 100 is on the reference route RR, The remote control device 200 determines a steering angle and an acceleration in such a manner as to prevent the vehicle 100 from deviating from the reference route RR. If the vehicle 100 is not on the reference route RR, in other words, if the vehicle 100 deviates from the reference route RR, the remote control device 200 determines a steering angle and an acceleration in such a manner as to return the vehicle 100 to the reference route RR. In other embodiments, the running control signal may include the speed of the vehicle 100 as a parameter instead of or in addition to the acceleration of the vehicle 100.

In step S4, the remote control device 200 transmits the generated running control signal to the vehicle 100. The remote control device 200 repeats the acquisition of vehicle location information, the determination of a target location, the generation of a running control signal, the transmission of the running control signal, and others in a predetermined cycle.

In step S5, the vehicle control device 110 of the vehicle 100 receives the running control signal transmitted from the remote control device 200. In step S6, the vehicle control device 110 controls the driving device 120, the steering device 130, and the braking device 140 using the received running control signal, thereby causing the vehicle 100 to run at the acceleration and the steering angle indicated by the running control signal. The vehicle control device 110 repeats the reception of a running control signal and the control over the various devices 120 to 140 in a predetermined cycle.

Figure 4:
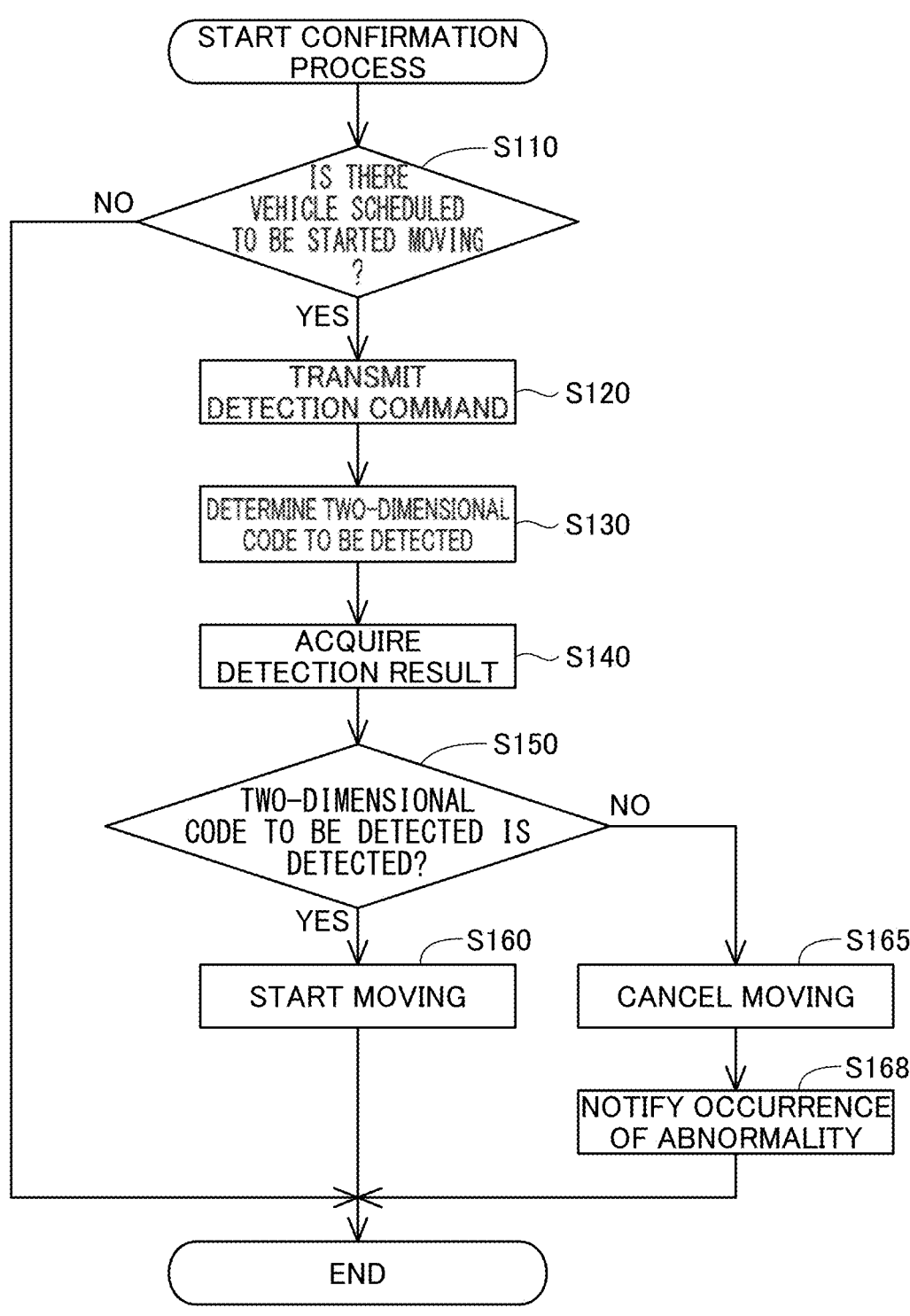
FIG. 4 is a flowchart illustrating contents of a confirmation process in the first embodiment.
Figure 5:
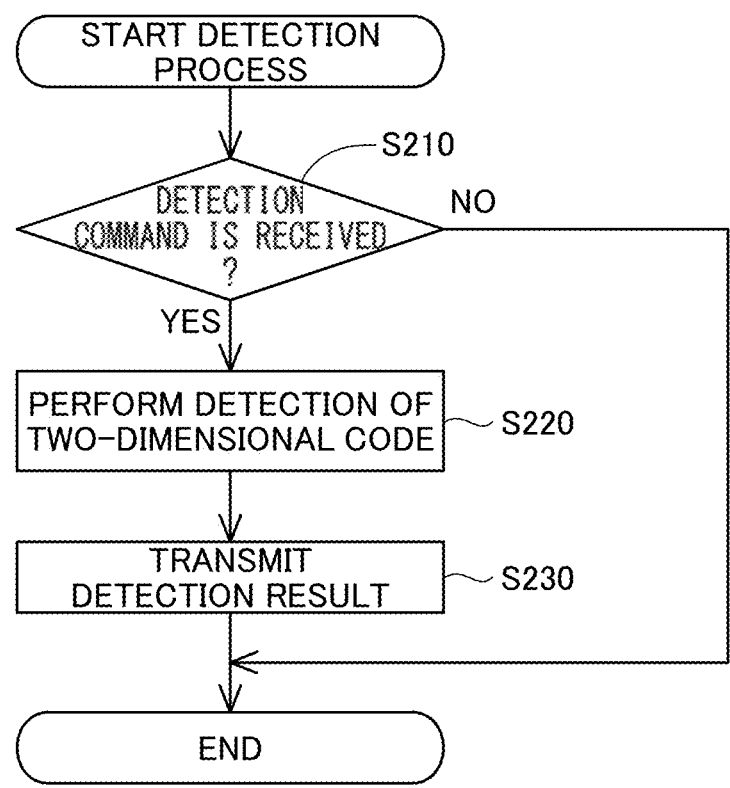
FIG. 5 is a flowchart illustrating contents of a detection process in the first embodiment.

FIG. 4 is a flowchart illustrating contents of a confirmation process executed in the remote control device 200. FIG. 5 is a flowchart illustrating contents of a detection process executed in the vehicle 100. A control method of the vehicle 100 performed in the unmanned driving system 10 will be described with reference to FIGS. 4 and 5.

The confirmation process shown in FIG. 4 is repeatedly executed in the remote control device 200. Once the confirmation process is started, in step S110, the remote control unit 210 determines whether or not there is the vehicle 100 scheduled to be started moving by remote control. In the following description, the vehicle 100 scheduled to be started moving by remote control is referred to as a target vehicle 100. In the present embodiment, the target vehicle 100 is arranged in a predetermined position and orientation in a starting point provided in the first place PL1 of the factory KJ or a starting point provided in the second place PL2 of the factory KJ. The remote control unit 210 determines that there is the target vehicle 100 when receiving, from the step management device 400, information indicating that the vehicle 100 is located in the starting point provided in the first place PL1 or information indicating that the vehicle 100 is located in the starting point provided in the second place PL2. When it is determined that there is no target vehicle 100 in step S110, the remote control unit 210 skips the processing after step S110 and ends the confirmation process.

When it is determined that there is the target vehicle 100 in step S110, the remote control unit 210 transmits, to the target vehicle 100, a remote control command to cause the target vehicle 100 to detect the landmark LM using the camera 160 in step S120. In the following description, the remote control command to cause the detection of the landmark LM is referred to as a detection command.

In step S130, the determination unit 230 determines the landmark LM to be detected by the camera 160 of the target vehicle 100. In the present embodiment, position information regarding the respective starting point of the places PL1, PL2, position information regarding the landmark LM provided in each of the places PL1, PL2, and the contents of the landmark LM provided in each of the places PL1, PL2 are recorded in the database DB stored in the memory 202. The determination unit 230 uses the database DB to determine the landmark LM to be detected by the camera 160 of the target vehicle 100. Note that the processing in step S130 may be executed before step S120 or after step S140.

In step S140, the acquisition unit 220 acquires the detection result by the camera 160 from the target vehicle 100. In step S150, the judgement unit 240 determines whether or not the landmark LM to be detected thus determined by the determination unit 230 is included in the detection result. The judgement unit 240 can use the database DB to determine whether or not the landmark LM to be detected is included in the detection result.

When it is determined that the landmark LM to be detected is included in the detection result in step S150, the remote control unit 210 starts moving the target vehicle 100 by remote control in step S160. Thereafter, the remote control device 200 ends the confirmation process.

When it is determined that the landmark LM to be detected is not included in the detection result in step S150, the remote control unit 210 cancels moving of the target vehicle 100 by remote control in step S165. In step S168, the remote control unit 210 uses the notification device 300 to notify occurrence of abnormality. Thereafter, the remote control device 200 ends the confirmation process.

The detection process shown in FIG. 5 is repeatedly executed by the camera control unit 116 of the target vehicle 100. Once the detection process is started, in step S210, the camera control unit 116 determines whether or not the detection command is received from the remote control device 200. When it is not determined that the detection command is received from the remote control device 200 in step S210, the camera control unit 116 skips the processing after step S210 and ends the detection process.

When it is determined that the detection command is received from the remote control device 200 in step S210, the camera control unit 116 performs detection of the landmark LM by the camera 160 in step S220. In step S230, the camera control unit 116 transmits the detection result by the camera 160 to the remote control device 200. Thereafter, the camera control unit 116 ends the detection process.

Figure 6:
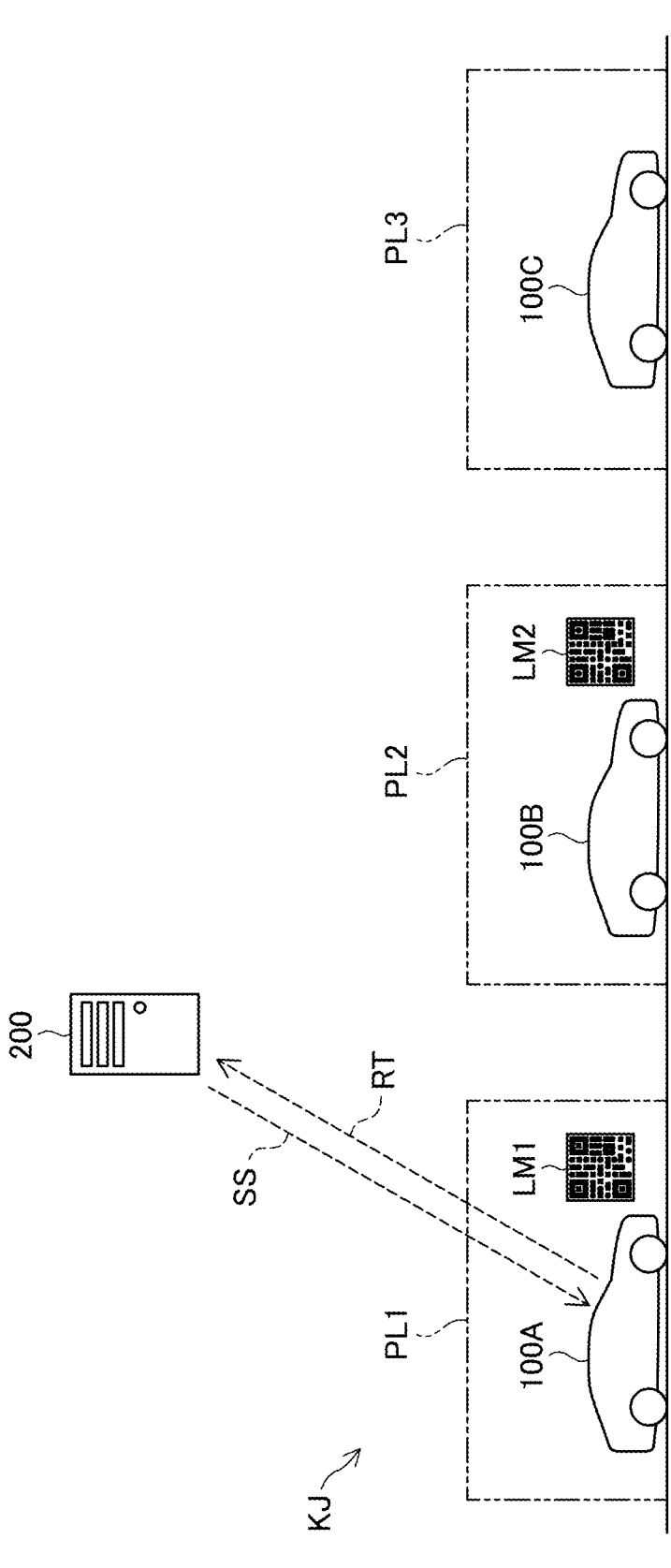
FIG. 6 is an illustrative diagram illustrating confirmation of a remote control target.

FIG. 6 is an illustrative diagram illustrating confirmation of whether or not an intended target is being remotely controlled. When the remote control device 200 intends to move the vehicle 100A located in the first place PL1 by remote control, a detection command SS is transmitted from the remote control device 200 to the vehicle 100A in the confirmation process. Since the remote control device 200 recognizes that the vehicle 100A is located in the first place PL1, it is determined that the landmark LM1 provided in the first place PL1 is to be detected in a detection result RT returned from a transmission destination of the detection command SS. By the detection process in the vehicle 100A to which the detection command SS is transmitted, the detection result RT indicating that the landmark LM1 has been detected is transmitted from the vehicle 100A to the remote control device 200. Accordingly, when the intended target is being remotely controlled, the landmark LM1 to be detected is included in the detection result RT.

On the other hand, when the remote control device 200 intends to move the vehicle 100A located in the first place PL1 by remote control but remotely controls the vehicle 100B located in the second place PL2 by mistake, the detection command SS is transmitted not to the vehicle 100A but to the vehicle 100B in the confirmation process. In this case, by the detection process in the vehicle 100B to which the detection command SS is transmitted, the detection result RT indicating that the landmark LM2 has been detected is transmitted from the vehicle 100B to the remote control device 200. When the remote control device 200 intends to move the vehicle 100A located in the first place PL1 by remote control but remotely controls the vehicle 100B located in the second place PL2 by mistake, the detection command SS is transmitted not to the vehicle 100A but to the vehicle 100C in the confirmation process. In this case, by the detection process in the vehicle 100C to which the detection command SS is transmitted, the detection result RT indicting that the landmark LM has not been detected is transmitted from the vehicle 100C to the remote control device 200. Accordingly, when an unintended target is being remotely controlled, the landmark LM1 to be detected is not included in the detection result RT.

According to the unmanned driving system 10 in the present embodiment described above, when it is determined that the landmark LM to be detected is included in the detection result RT, the remote control device 200 starts moving the target vehicle 100 by remote control, and when it is determined that the landmark LM to be detected is not included in the detection result RT, the remote control device 200 cancels moving of the target vehicle 100 by remote control. In other words, after confirming whether or not the intended vehicle 100 is being remotely controlled, the remote control device 200 starts moving the target vehicle 100 by remote control. Accordingly, it is possible to prevent moving the unintended vehicle 100 by remote control.

Further, in the present embodiment, when it is determined that the landmark LM to be detected is not included in the detection result RT, the remote control device 200 uses the notification device 300 to notify the administrator and the like of the occurrence of abnormality. Accordingly, the administrator and the like can grasp the occurrence of abnormality early and implement countermeasures.

Additionally, in a case where the remote control device 200 remotely controls a plurality of vehicles 100, a control command can be transmitted from the communication device 205 to the vehicle 100 that does not correspond to the control command. Here, transmission of the control command from the communication device 205 to the vehicle 100 that does not correspond to the control command means that the control command generated to remotely control one vehicle 100 among the plurality of vehicles 100 is transmitted from the communication device 205 to the vehicle 100 other than the one vehicle 100. Such event may be referred to as mix-up of the vehicle 100 as a remote control target. In the case where the remote control device 200 remotely controls the plurality of vehicles 100, there is a possibility that the mix-up of the vehicle 100 as the remote control target occurs due to a defect of the unmanned driving system 10, a human error of the factory worker, or the like. For example, as shown in FIG. 3A, in a case where the remote control device 200 remotely controls the five vehicles 100A to 100E in order of the vehicle 100E, the vehicle 100D, the vehicle 100C, the vehicle 100B, and the vehicle 100A, the control command can be transmitted from the communication device 205 to the vehicle 100 that does not correspond to the control command. Specifically, if the communication device 150 removed from the vehicle 100C is mounted on the vehicle 100A by mistake even though the communication device 150 removed from the vehicle 100C is scheduled to be mounted on the vehicle 100B after remote control of the vehicle 100C by the remote control device 200 is ended, the control command generated to remotely control the vehicle 100B is transmitted to the vehicle 100A. Even in such a case, in the present embodiment, by determining whether or not the landmark LM to be detected by the camera 160 mounted on the vehicle 100B is detected, it is possible to detect that the control command is transmitted from the communication device 205 to the vehicle 100 that does not correspond to the control command. Therefore, it is possible to remove, from the vehicle 100A, the communication device 150 mistakenly mounted on the vehicle 100A; mount it on the vehicle 100B; and start remote control of the vehicle 100B.

B. Second Embodiment

Figure 7:
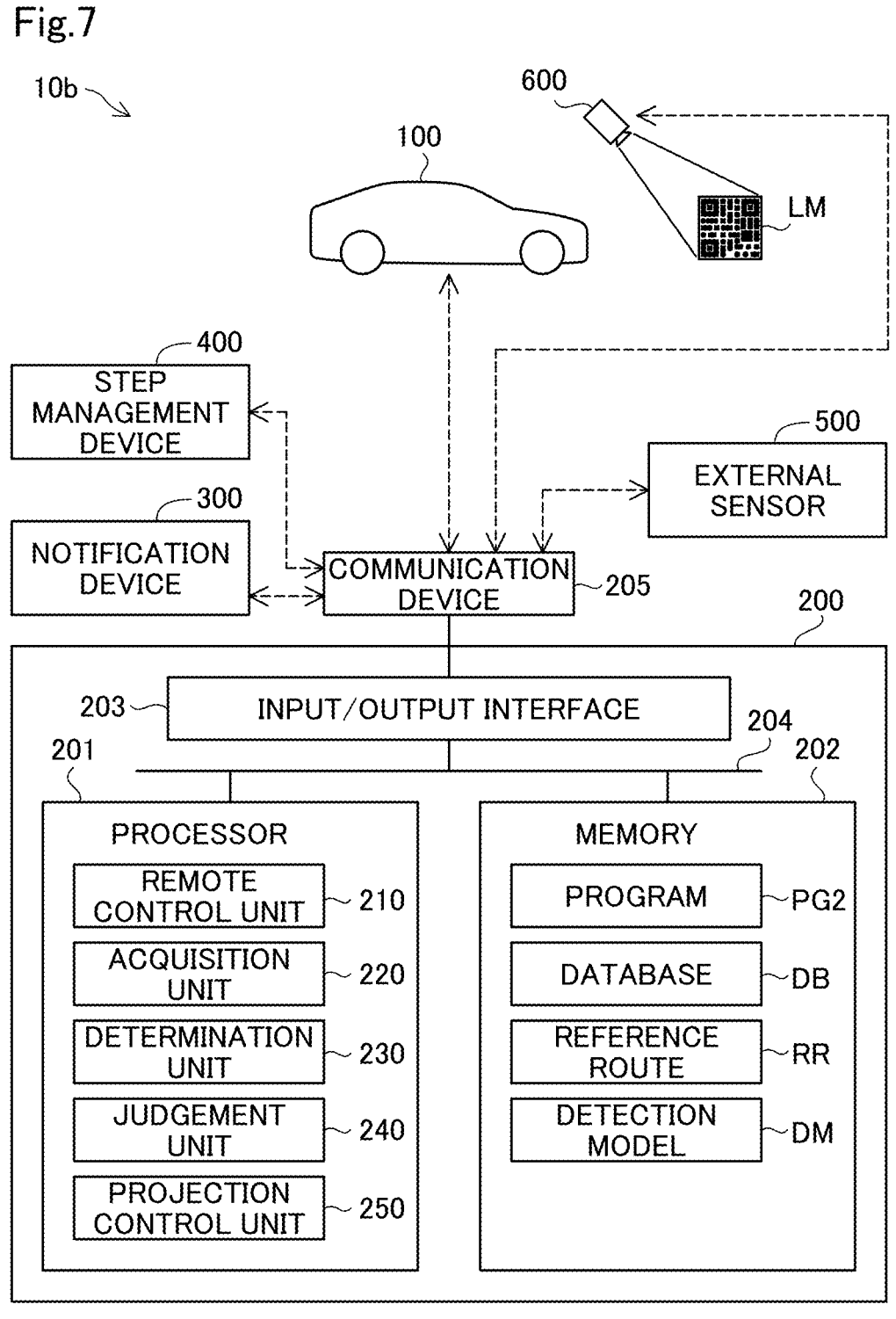
FIG. 7 is an illustrative diagram illustrating a configuration of an unmanned driving system in a second embodiment.

FIG. 7 is an illustrative diagram illustrating a configuration of an unmanned driving system 10*b* in a second embodiment. The second embodiment is different from the first embodiment in that the unmanned driving system 10*b* includes a projection device 600 to project a video in the two-dimensional code used as the landmark LM. The other configuration is the same as the first embodiment unless otherwise specified. Note that in the present embodiment, the remote control device 200 corresponds to the "control device" of the present disclosure.

The projection device 600 is fixed to a wall surface or a ceiling surface of the factory KJ, for example, and projects the video in the two-dimensional code on the wall surface or a floor surface of the factory KJ. In the present embodiment, the projection device 600 is provided in the first place PL1 and the second place PL2. The projection device 600 provided in the first place PL1 projects the video in the two-dimensional code used as the landmark LM1, and the projection device 600 provided in the second place PL2 projects the video in the two-dimensional code used as the landmark LM2. Note that the video projected by the projection device 600 may be referred to as a projection image.

In the present embodiment, the processor 201 of the remote control device 200 executes the computer program PG2 previously stored in the memory 202, thereby functioning as the remote control unit 210, the acquisition unit 220, the determination unit 230, and the judgement unit 240, and further functioning as a projection control unit 250. The projection control unit 250 controls the projection device 600. The projection control unit 250 causes the projection device 600 to project the video in the two-dimensional code while the detection process in the target vehicle 100 is being executed.

According to the unmanned driving system 10*b* in the present embodiment described above, it is possible to display the two-dimensional code as the landmark LM on the wall surface or the floor surface of the factory KJ, even without attaching the two-dimensional code as the landmark LM to the wall surface or the floor surface of the factory KJ. Accordingly, it is possible to display the two-dimensional code even in a place where it is difficult to attach the two-dimensional code.

C. Third Embodiment

Figure 8:
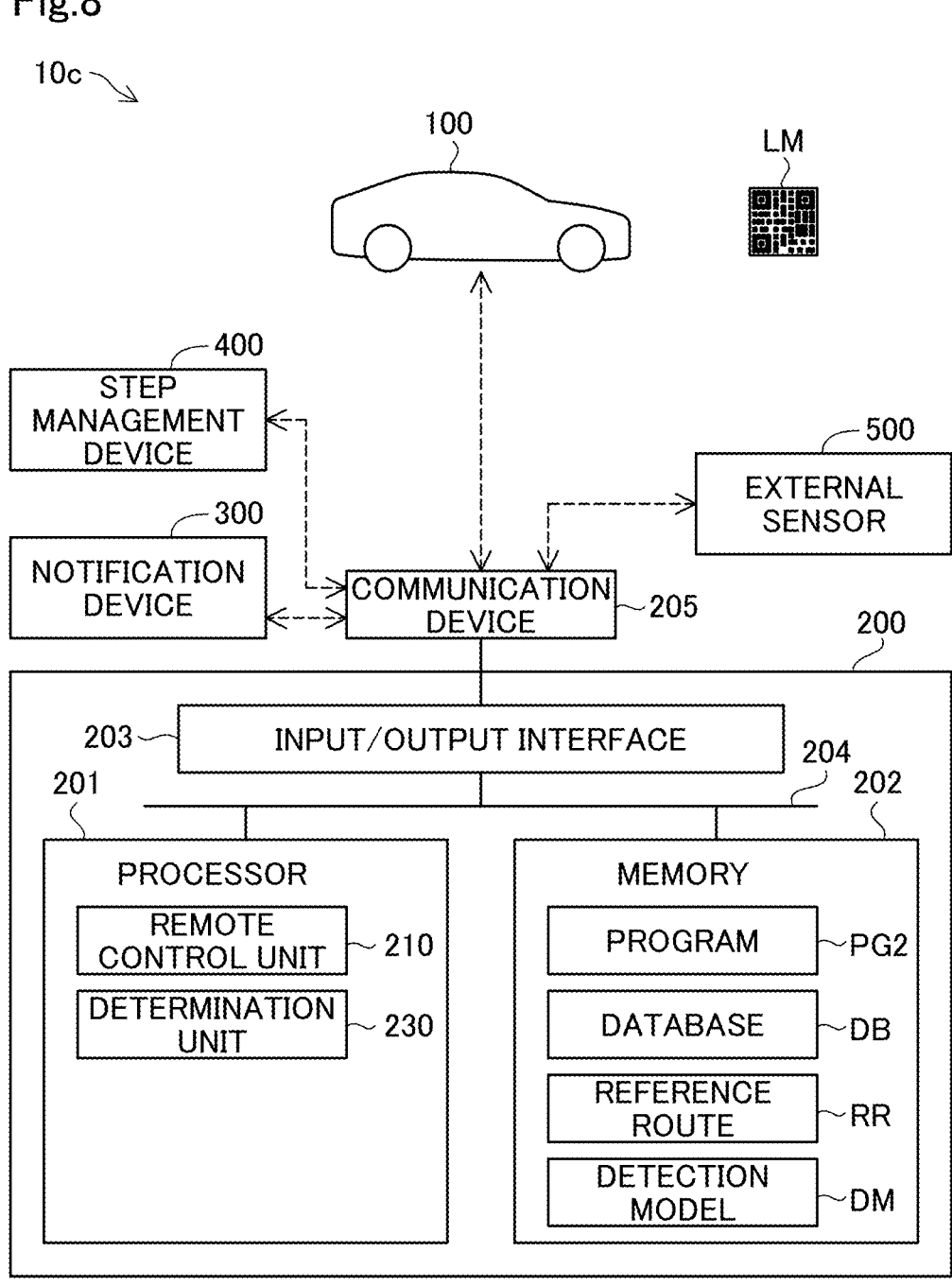
FIG. 8 is an illustrative diagram illustrating a configuration of an unmanned driving system in a third embodiment.
Figure 9:
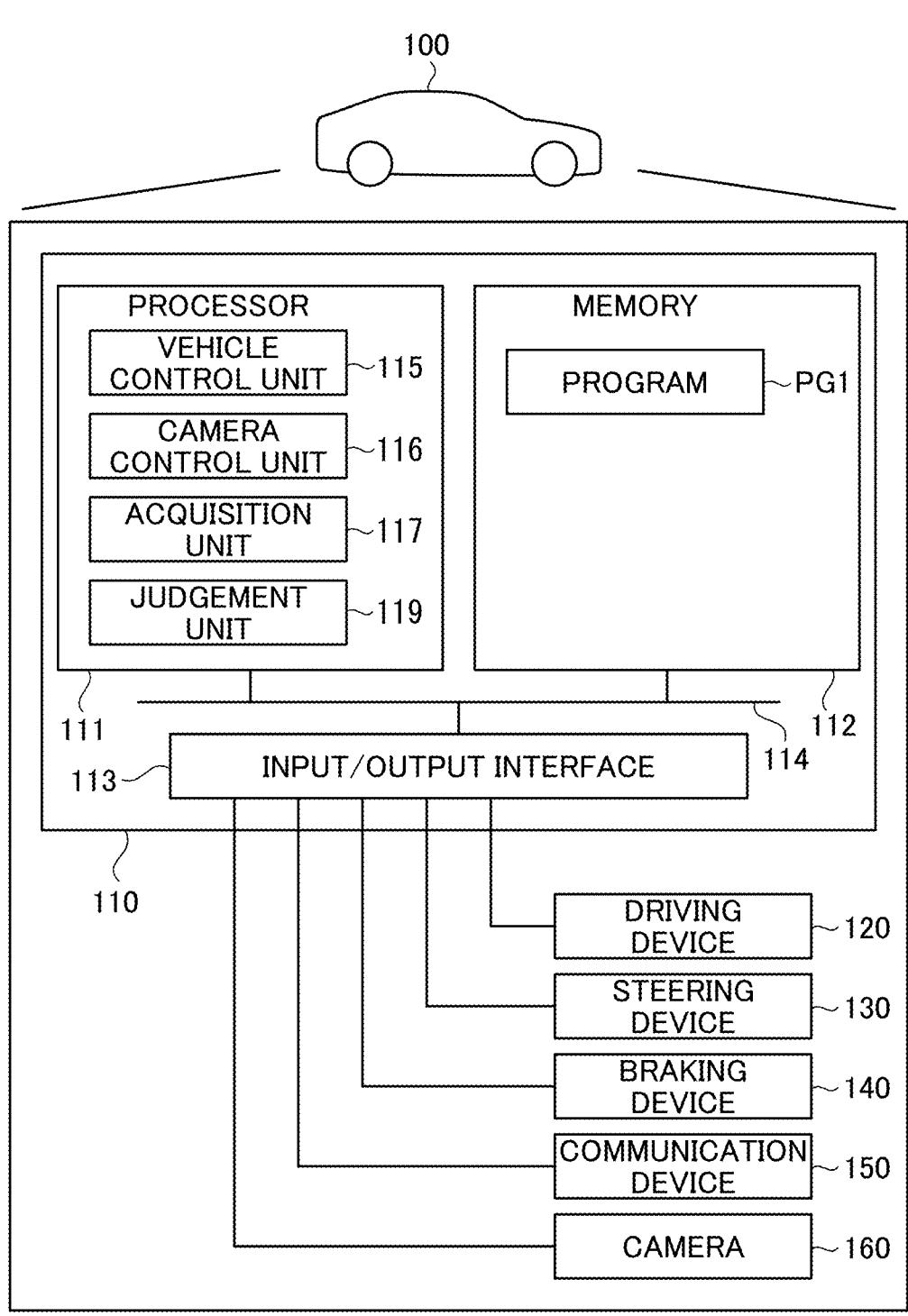
FIG. 9 is an illustrative diagram illustrating a configuration of a vehicle in the third embodiment.

FIG. 8 is an illustrative diagram illustrating a configuration of an unmanned driving system 10c in a third embodiment. FIG. 9 is an illustrative diagram illustrating a configuration of the vehicle 100 in the third embodiment. The third embodiment is different from the first embodiment in that in the unmanned driving system 10c, determination of whether or not the landmark LM to be detected is included in the detection result is performed in the vehicle 100. The other configuration is the same as the first embodiment unless otherwise specified. Note that in the present embodiment, the remote control device 200 corresponds to the "control device" of the present disclosure.

As shown in FIG. 8, in the present embodiment, the processor 201 of the remote control device 200 executes the computer program PG2 previously stored in the memory 202, thereby functioning as the remote control unit 210 and the determination unit 230. In the present embodiment, the remote control device 200 does not include the acquisition unit 220 or the judgement unit 240.

As shown in FIG. 9, in the present embodiment, the processor 111 of the vehicle control device 110 executes the computer program PG1 previously stored in the memory 112, thereby functioning as the vehicle control unit 115 and the camera control unit 116, and further functioning as an acquisition unit 117 and a judgement unit 119. The acquisition unit 117 acquires information regarding the landmark LM to be detected from the remote control device 200. The judgement unit 119 determines whether or not the landmark LM to be detected by the camera 160 is included in the detection result by the camera 160.

Figure 10:
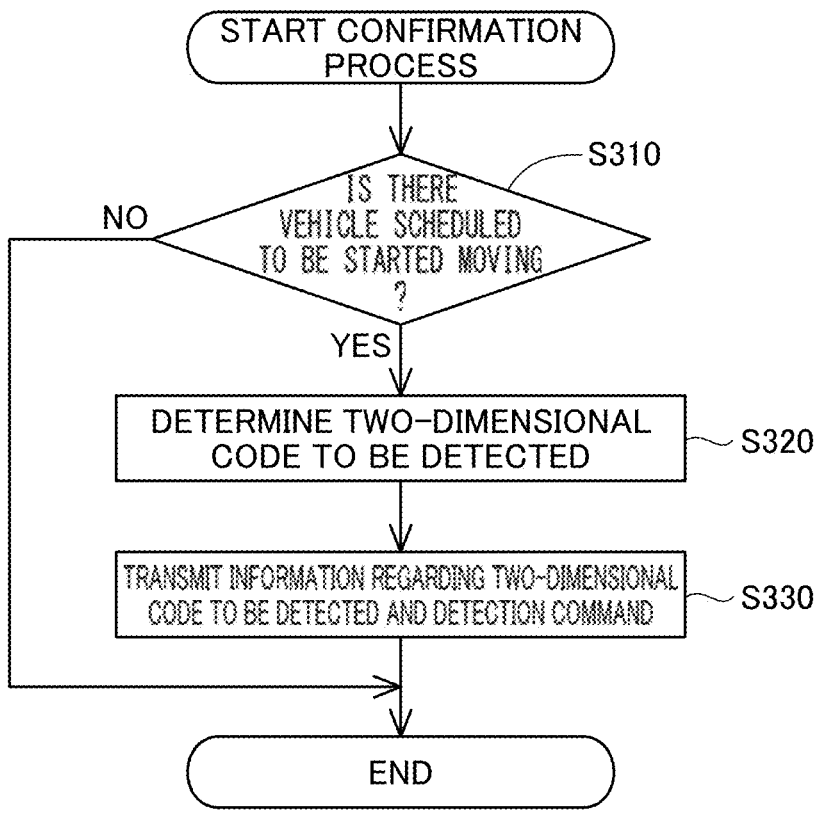
FIG. 10 is a flowchart illustrating contents of a confirmation process in the third embodiment.
Figure 11:
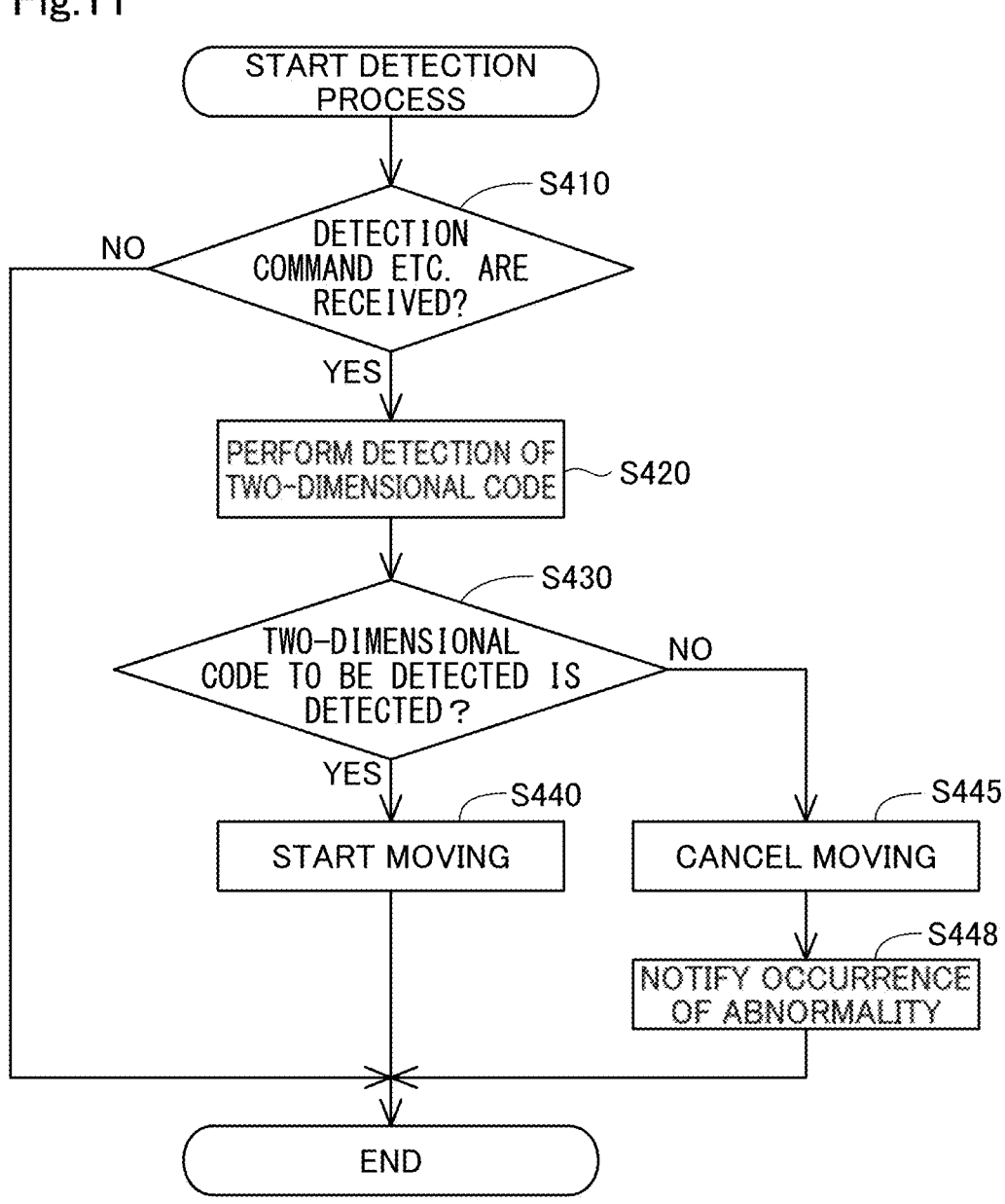
FIG. 11 is a flowchart illustrating contents of a detection process in the third embodiment.
Figure 13:
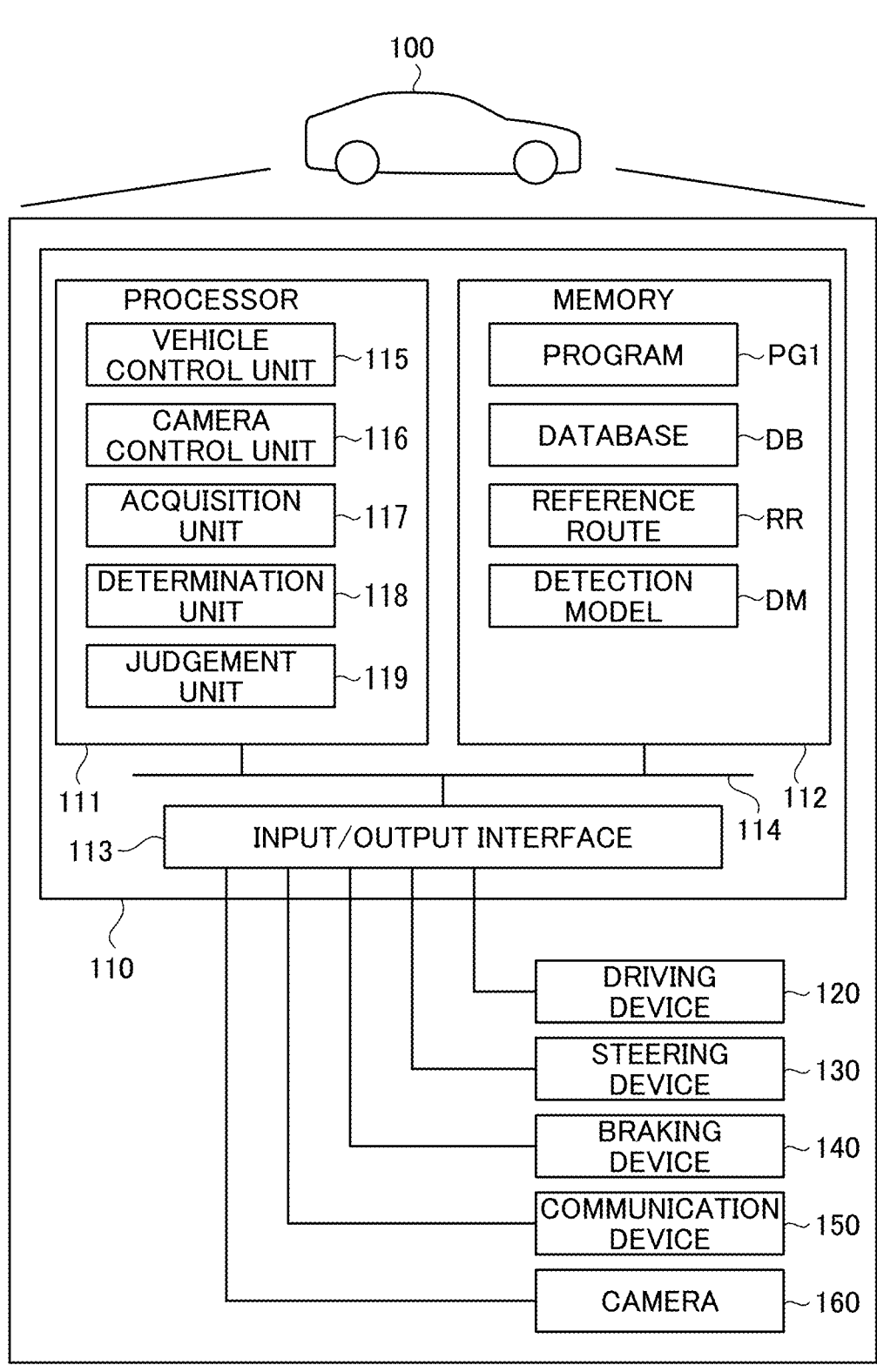
FIG. 13 is an illustrative diagram illustrating a configuration of a vehicle in the fourth embodiment.

FIG. 10 is a flowchart illustrating contents of the confirmation process in the third embodiment. FIG. 11 is a flowchart illustrating contents of the detection process in the third embodiment. The confirmation process shown in FIG. 10 is repeatedly executed in the remote control device 200. Once the confirmation process is started, in step S310, the remote control unit 210 determines whether or not there is the vehicle 100 scheduled to be started moving by remote control, in other words, the target vehicle 100. When it is determined that there is no target vehicle 100 in step S310, the remote control unit 210 skips the processing after step S310 and ends the confirmation process.

When it is determined that there is the target vehicle 100 in step S310, the determination unit 230 determines the landmark LM to be detected by the camera 160 of the target vehicle 100 in step S320 in the same manner as the first embodiment. In step S330, the remote control unit 210 transmits the detection command and the information regarding the landmark LM to be detected to the target vehicle 100. Thereafter, the remote control device 200 ends the confirmation process.

The detection process shown in FIG. 11 is repeatedly executed in the vehicle control device 110. Once the detection process is started, in step S410, the acquisition unit 117 determines whether or not the detection command and the information regarding the landmark LM to be detected are received from the remote control device 200. When it is not determined that the detection command is received from the remote control device 200 in step S410, the camera control unit 116 skips the processing after step S410 and ends the detection process.

When it is determined that the detection command is received from the remote control device 200 in step S410, the camera control unit 116 performs detection of the landmark LM by the camera 160 in step S420. In step S430, the judgement unit 119 determines whether or not the landmark LM to be detected is included in the detection result of the landmark LM by the camera 160 using the information regarding the landmark LM to be detected received from the remote control device 200.

When it is determined that the landmark LM to be detected is included in the detection result in step S430, the vehicle control unit 115 starts moving the vehicle 100 by remote control in step S440. When it is determined that the landmark LM to be detected is not included in the detection result in step S430, the vehicle control unit 115 cancels moving of the vehicle 100 by remote control in step S445. For example, the vehicle control unit 115 disconnects communication with the remote control device 200, thereby cancelling the moving by remote control. In step S448, the vehicle control unit 115 uses the notification device 300 to notify occurrence of abnormality. After step S440 or S448, the vehicle control device 110 ends the detection process.

According to the unmanned driving system 10c in the present embodiment described above, it is possible to confirm, not in the remote control device 200 but in the vehicle 100, whether or not the remote control device 200 is remotely controlling the intended vehicle 100.

D. Fourth Embodiment

Figure 12:
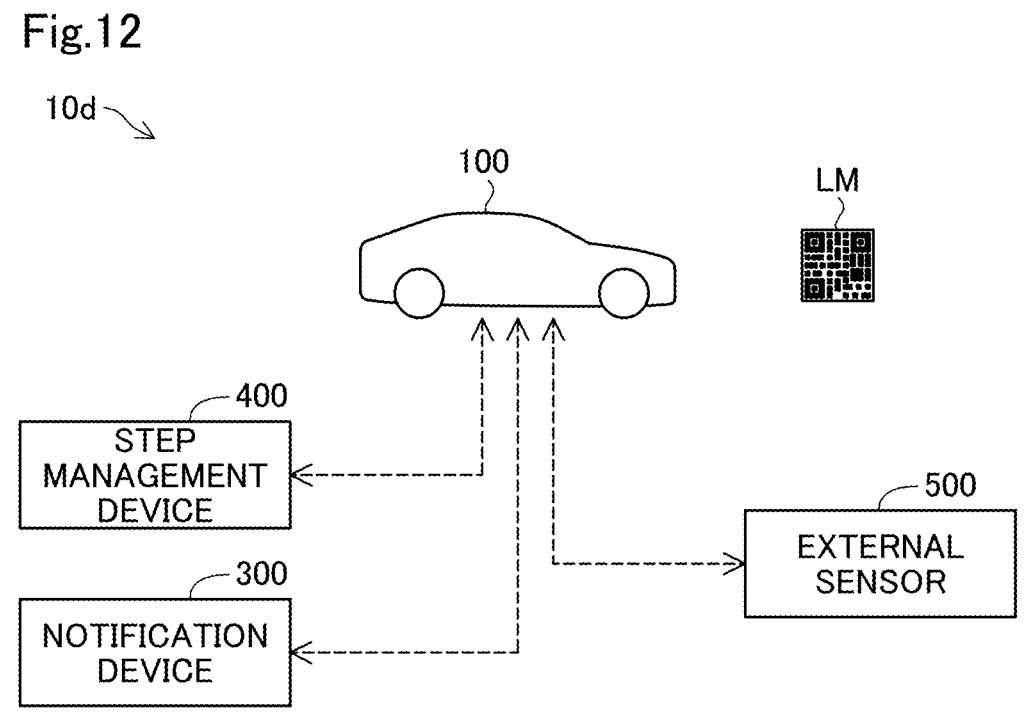

FIG. 12 is an illustrative diagram illustrating a configuration of an unmanned driving system 10d in a fourth embodiment. The fourth embodiment is different from the first embodiment in that the unmanned driving system 10d does not include the remote control device 200, and the vehicle 100 runs under autonomous control, not by remote control. The other configuration is the same as the first embodiment unless otherwise specified. Note that in the present embodiment, the vehicle control device 110 corresponds to the "control device" of the present disclosure.

In the present embodiment, the vehicle 100 is configured to be capable of running under autonomous control. The vehicle 100 can communicate with the notification device 300, the step management device 400, and the external sensor 500 via wireless communication using the communication device 150.

The processor 111 of the vehicle control device 110 executes the computer program PG1 previously stored in the memory 112, thereby functioning as the vehicle control unit 115 and the camera control unit 116, and further functioning as the acquisition unit 117, a determination unit 118, and the judgement unit 119. The acquisition unit 117 acquires the detection result of the landmark LM by the camera 160. The determination unit 118 determines the landmark LM to be detected by the camera 160. The judgement unit 119 determines whether or not the landmark LM to be detected by the camera 160 is included in the detection result acquired by the acquisition unit 117. In the present embodiment, the memory 112 stores the database DB, the reference route RR, and a detection model DM in advance. Note that the vehicle control unit 115 may be simply referred to as a control unit.

Figure 14:
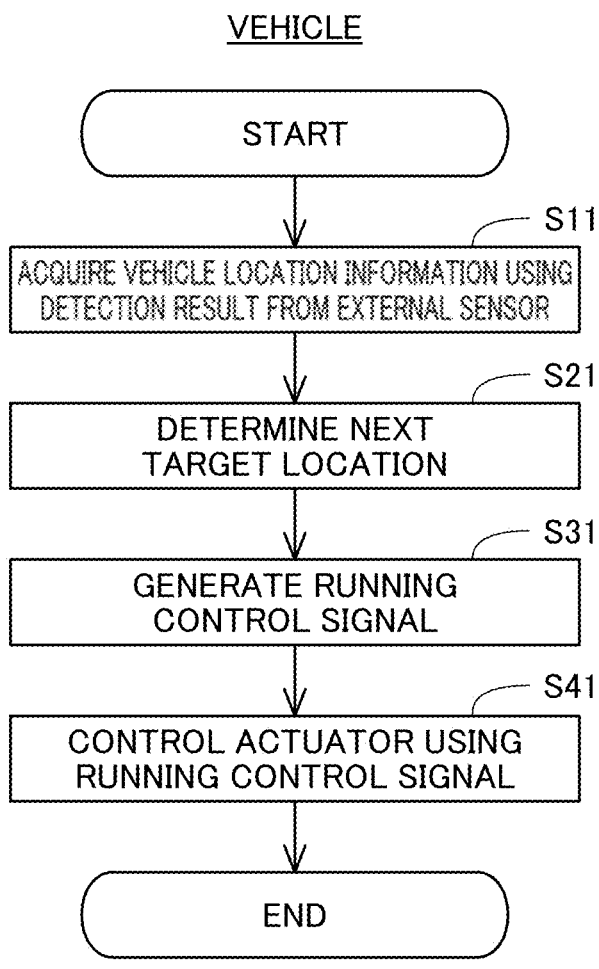
FIG. 14 is a flowchart illustrating a process procedure of running control of a vehicle in the fourth embodiment.

FIG. 14 is a flowchart showing a processing procedure for running control of the vehicle 100 in the present embodiment. In step S11, the vehicle control device 110 acquires vehicle location information using detection result output from the camera as the external sensor 500. In step S21, the vehicle control device 110 determines a target location to which the vehicle 100 is to move next. In step S31, the vehicle control device 110 generates a running control signal for causing the vehicle 100 to run to the determined target location. In step S41, the vehicle control device 110 controls the driving device 120, the steering device 130, and the braking device 140 using the generated running control signal, thereby causing the vehicle 100 to run by following a parameter indicated by the running control signal. The vehicle control device 110 repeats the acquisition of vehicle location information, the determination of a target location, the generation of a running control signal, and the control over the various devices 120 to 140 in a predetermined cycle.

Figure 15:
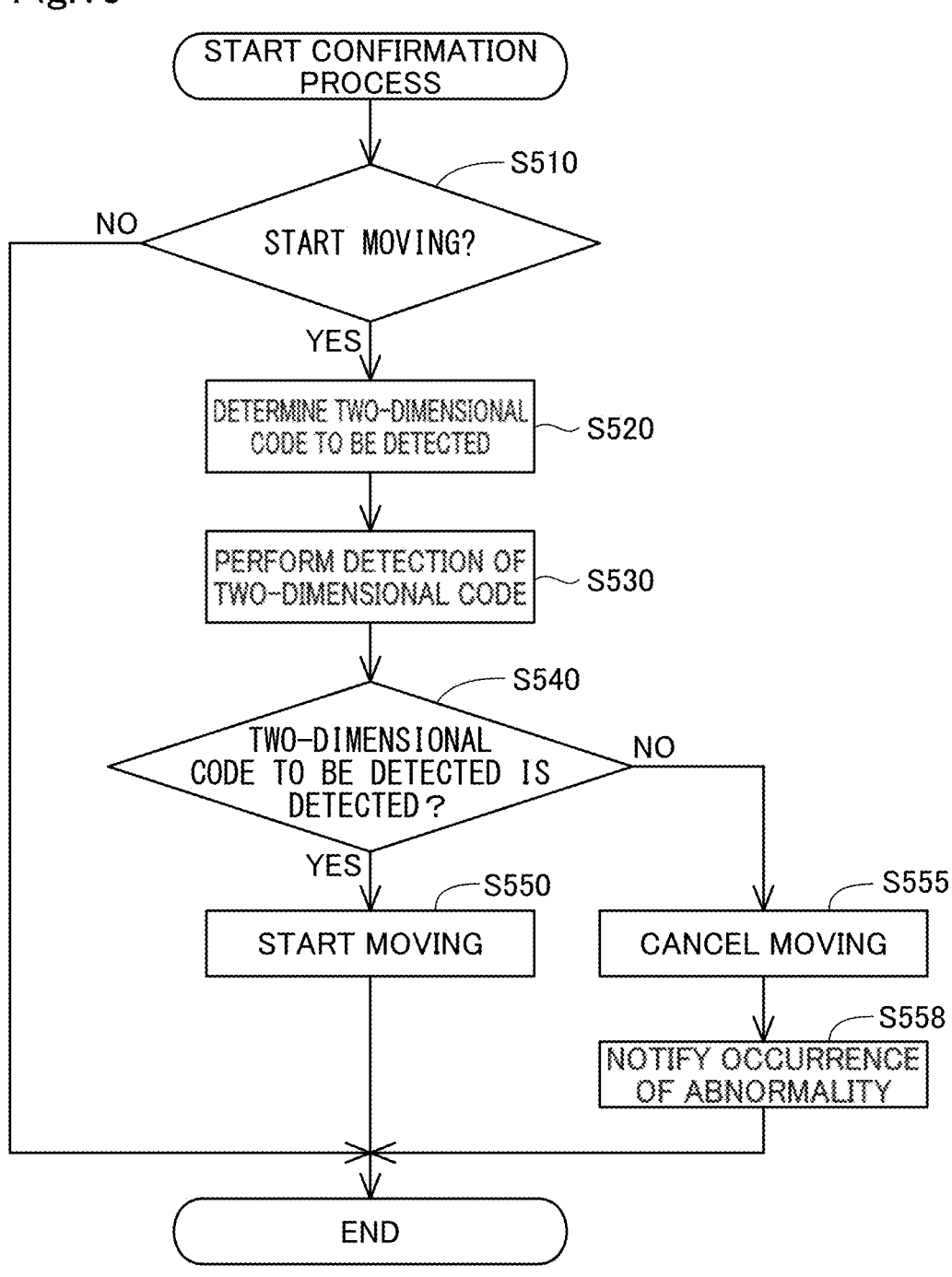
FIG. 15 is a flowchart illustrating contents of a confirmation process in the fourth embodiment.

FIG. 15 is a flowchart illustrating contents of the confirmation process in the present embodiment. The confirmation process shown in FIG. 15 is executed by the vehicle control device 110 before the vehicle 100 starts moving under autonomous control. Once the confirmation process is started, in step S510, the vehicle control unit 115 determines whether or not to start moving under autonomous control. For example, when receiving information indicating that the own vehicle is located in the starting point of the first place PL1 or the starting point of the second place PL2 from the step management device 400, the vehicle control unit 115 determines to start moving under autonomous control. When it is determined not to start moving under autonomous control in step S510, the vehicle control unit 115 skips the processing after step S510 and ends the confirmation process.

When it is determined to start moving under autonomous control in step S510, the determination unit 118 determines the landmark LM to be detected by the camera 160 of the own vehicle in step S520. In the present embodiment, the position information regarding the respective starting point of the places PL1, PL2, the position information regarding the landmark LM provided in each of the places PL1, PL2, and the contents of the landmark LM provided in each of the places PL1, PL2 are recorded in the database DB stored in the memory 112. The determination unit 118 uses the database DB to determine the landmark LM to be detected by the camera 160 of the own vehicle. Note that the determination unit 118 may use position information regarding the own vehicle acquired by the vehicle control unit 115 using the external sensor 500, as well as the database DB to determine the landmark LM to be detected by the camera 160.

In step S530, the camera control unit 116 performs detection of the landmark LM by the camera 160, and the acquisition unit 117 acquires the detection result of the landmark LM by the camera 160. In step S540, the judgement unit 119 determines whether or not the landmark LM determined by the determination unit 118, in other words, the landmark LM to be detected is detected by the camera 160. When it is determined that the landmark LM to be detected is detected in step S540, the vehicle control unit 115 starts moving the vehicle 100 by autonomous control in step S550. In contrast, when it is determined that the landmark LM to be detected is not detected in step S540, the vehicle control unit 115 cancels moving of the vehicle 100 under autonomous control in step S555. In step S558, the vehicle control unit 115 uses the notification device 300 to notify occurrence of abnormality. After step S550 or S558, the vehicle control device 110 ends the confirmation process.

According to the unmanned driving system 10*d* in the present embodiment described above, it is possible to run the vehicle 100 under the autonomous control thereof without remotely controlling the vehicle 100 from outside. Further, in the present embodiment, the vehicle 100 can confirm whether or not the landmark LM to be detected by the camera 160 mounted on the own vehicle is detected, thereby confirming whether or not the position information regarding the own vehicle acquired from the outside thereof is correct.

E. Other Embodiments (E1) In the unmanned driving systems 10 to 10*d* in the above first to fourth embodiments, the confirmation process is executed before starting moving the vehicle 100 by unmanned driving. In contrast, in the other embodiment E1, the confirmation process may be executed while the vehicle 100 is being moved by unmanned driving. In this case, cancellation of the moving by unmanned driving may include braking the vehicle 100 by unmanned driving to stop the vehicle 100. In the confirmation process executed while the vehicle 100 is being moved by unmanned driving, when it is determined that the landmark LM to be detected is not included in the detection result, the moving by unmanned driving may not be cancelled, but the vehicle 100 may be decelerated to the extent that the vehicle 100 does not stop or an upper limit of a moving speed of the vehicle 100 may be reduced without decelerating the vehicle 100.

(E2) In the unmanned driving systems 10 to 10*d* in the above first to fourth embodiments, the vehicle 100 is equipped with the camera 160 and uses the camera 160 to detect the landmark LM. In contrast, in the other embodiment E2, the vehicle 100 may be equipped with a detector such as a LiDAR (Light Detection and Ranging) to detect shape of the landmark LM and a distance to the landmark LM. In this case, the shape of the landmark LM and the distance to the landmark LM can be used to identity the landmark LM. Furthermore, the vehicle 100 may be equipped with a detector such as a millimeter wave radar and an ultrasonic sonar to detect the distance to the landmark LM. In this case, the distance to the landmark LM can be used to identity the landmark LM.

(E3) In the unmanned driving systems 10 to 10*d* in the above first to fourth embodiments, the judgement unit 240, 119 determines, in the confirmation process, whether or not the landmark LM to be detected is included in the detection result, and the remote control unit 210 or the vehicle control unit 115 varies the contents of the subsequent processing depending on the determination result by the judgement unit 240, 119. In contrast, in the other embodiment E3, the judgement unit 240, 119 may determine that the landmark LM to be detected is included in the detection result and determine whether or not the landmark LM to be detected is detected in a direction in which the landmark LM is to be detected, and the remote control unit 210 or the vehicle control unit 115 may vary the contents of the subsequent processing depending on the determination result by the judgement unit 240, 119. In this case, it is possible to accurately determine whether or not the intended vehicle 100 is being controlled.

(E4) In the unmanned driving systems 10 to 10*d* in the above first to fourth embodiments, the remote control unit 210 and the vehicle control unit 115 use the notification device 300 located outside the vehicle 100 to notify the occurrence of abnormality. In contrast, in the other embodiment E4, the remote control unit 210 may sound a horn of the vehicle 100 by remote control or flash a head lamp of the vehicle 100 by remote control, thereby notifying the occurrence of abnormality. In the other embodiment E4, the vehicle control unit 115 may sound the horn of the own vehicle or flash the head lamp of the own vehicle, thereby notifying the occurrence of abnormality.

(E5) In the other embodiment E5, the camera 160 mounted on the vehicle 100 in the above fourth embodiment may detect the landmark LM projected by the projection device 600. In this case, the vehicle control device 110 may be provided with the projection control unit to control the projection device 600 via wireless communication.

(E6) In the unmanned driving systems 10 to 10d in the above first to fourth embodiments, the external sensor 500 is not limited to the camera but may be the distance measuring device, for example. The distance measuring device is a light detection and ranging (LiDAR) device, for example. In this case, detection result output from the external sensor 500 may be three-dimensional point cloud data representing the vehicle 100. The remote control device 200 and the vehicle 100 may acquire the vehicle location information through template matching using the three-dimensional point cloud data as the detection result and reference point cloud data, for example.

(E7) In the unmanned driving systems 10 to 10c in the above first to third embodiments, the remote control device 200 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The remote control device 200 may acquire vehicle location information, determine a target location to which the vehicle 100 is to move next, and generate a route from a current location of the vehicle 100 indicated by the acquired vehicle location information to the target location. The remote control device 200 may generate a route to the target location between the current location and a destination or generate a route to the destination. The remote control device 200 may transmit the generated route to the vehicle 100. The vehicle 100 may generate a running control signal in such a manner as to cause the vehicle 100 to run along the route received from the remote control device 200 and control the driving device 120, the steering device 130, and the braking device 140 using the generated running control signal.

(2) The remote control device 200 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control the driving device 120, the steering device 130, and the braking device 140 using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the remote control device 200 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(E8) In the unmanned driving system 10d in the fourth embodiment, the vehicle 100 may be equipped with an internal sensor, and detection result output from the internal sensor may be used in at least one of generation of a route and generation of a running control signal. For example, the vehicle 100 may acquire detection result from the internal sensor, and in generating the route, may reflect the detection result from the internal sensor in the route. The vehicle 100 may acquire detection result from the internal sensor, and in generating the running control signal, may reflect the detection result from the internal sensor in the running control signal.

(E9) In the unmanned driving system 10d in the fourth embodiment, the vehicle 100 acquires vehicle location information using detection result from the external sensor 500. By contrast, the vehicle 100 may be equipped with an internal sensor, the vehicle 100 may acquire vehicle location information using detection result from the internal sensor, determine a target location to which the vehicle 100 is to move next, generate a route from a current location of the vehicle 100 indicated by the acquired vehicle location information to the target location, generate a running control signal for running along the generated route, and control the driving device 120, the steering device 130, and the braking device 140 of the vehicle 100 using the generated running control signal. In this case, the vehicle 100 is capable of running without using any detection result from the external sensor 500. The vehicle 100 may acquire target arrival time or traffic congestion information from outside the vehicle 100 and reflect the target arrival time or traffic congestion information in at least one of the route and the running control signal. The functional configuration of the unmanned driving systems 10 to 10d may be entirely provided at the vehicle 100. Specifically, the processes realized by the unmanned driving systems 10 to 10d in the present disclosure may be realized by the vehicle 100 alone.

(E10) In the unmanned driving systems 10 to 10c in the above first to third embodiments, the remote control device 200 automatically generates a running control signal to be transmitted to the vehicle 100. By contrast, the remote control device 200 may generate a running control signal to be transmitted to the vehicle 100 in response to operation by an external operator existing outside the vehicle 100. For example, the external operator may operate an operating device including a display on which a captured image output from the external sensor 500 is displayed, steering, an accelerator pedal, and a brake pedal for operating the vehicle 100 remotely, and a communication device for making communication with the remote control device 200 through wire communication or wireless communication, for example, and the remote control device 200 may generate a running control signal responsive to the operation on the operating device. In this embodiment, a captured image of the landmark LM captured by the camera 160 mounted on the vehicle 100 may be displayed on the display of the operating device and the operator may confirm the landmark LM.

(E11) In each of the above-described embodiments, the vehicle 100 is simply required to have a configuration to become movable by unmanned driving. The vehicle 100 may embodied as a platform having the following configuration, for example. The vehicle 100 is simply required to include at least the vehicle control device 110, the driving device 120, the steering device 130, and the braking device 140 in order to fulfill three functions including "run," "turn," and "stop" by unmanned driving. In order for the vehicle 100 to acquire information from outside for unmanned driving, the vehicle 100 is simply required to include the communication device 150 further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from the factory KJ, or a remaining component such as a bodyshell may be mounted on the vehicle 100 after the vehicle 100 is shipped from the factory KJ while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(E12) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(E13) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

(E14) The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:
1. A control device, comprising:
a memory that stores a program; and
one or more processors that execute the program stored in the memory, wherein the one or more processors are configured to:
acquire a detection result by a detector, wherein the detector is mounted on a moving object movable by unmanned driving, wherein the moving object is one of a plurality of moving objects;
determine a landmark intended to be detected by the detector, wherein the landmark intended to be detected is located outside a target moving object, wherein the target moving object is one of the plurality of moving objects; and
perform different processing for moving the moving object depending on whether or not the landmark intended to be detected is included in the detection result,
wherein
the landmark intended to be detected is determined using position information indicative of a position of a moving object intended to be moved and position information indicative of a position of the landmark, such that the landmark intended to be detected is provided in a place where the moving object intended to be moved is located, wherein when the landmark intended to be detected, is included in the detection result, start moving the moving object, wherein when (i) the landmark intended to be detected, is not included in the detection result, and (ii) a different landmark than the landmark intended to be detected is included in the detection result, cancel moving of the moving object.

2. The control device according to claim 1, wherein based upon the determination that the landmark intended to be detected, is not included in the detection result, the one or more processors executes at least one of a process of notifying occurrence of abnormality, a process of changing a speed of the moving object, and a process of stopping unmanned driving for the moving object.

3. The control device according to claim 1, wherein the detector is a camera, and the landmark is a two-dimensional code.

4. The control device according to claim 1, wherein the landmark is a projection image projected by a projection device located outside the moving object, and the one or more processors controls the projection device.

5. The control device according to claim 1, wherein the one or more processors determine a direction of the landmark detected by the detector with respect to the moving body, and the one or more processors perform different processing for moving the moving object when the landmark intended to be detected is included in the detection result, depending on whether or not the landmark included in the detection result is located in the direction of the landmark.

6. A moving object movable by unmanned driving, comprising:

a detector configured to detect a landmark located outside the moving object;

a memory that stores a program;

a processor that executes the program stored in the memory, wherein the processor is configured to:

determine a landmark intended to be detected by the detector; and perform different processing for moving the moving object depending on whether or not the landmark intended to be detected is included in a detection result by the detector, determine the landmark intended to be detected using position information indicative of a position of a moving object intended to be moved, and position information indicative of a position of the landmark, such that the landmark intended to be detected is provided in the place where the moving object intended to be moved is located, wherein when the landmark intended to be detected is included in the detection result, the one or more processors start moving the moving object, wherein when (i) the landmark intended to be detected, is not included in the detection result, and (ii) a different landmark than the landmark intended to be detected is included in the detection result, cancel moving of the moving object.

7. A control method, comprising:

acquiring a detection result by a detector, wherein the detector is mounted on a moving object movable by unmanned driving;

determining a landmark intended to be detected by the detector, wherein the landmark intended to be detected is located outside the moving object; and performing different processing for moving the moving object depending on whether or not the landmark intended to be detected is included in the detection result, wherein the landmark intended to be detected is determined using position information indicative of a position of a moving object intended to be moved, and position information indicative of a position of the landmark, such that the landmark intended to be detected is provided in the place where the moving object intended to be moved is located, wherein when the landmark intended to be detected is included in the detection result, start moving the moving object, and wherein when (i) the landmark intended to be detected, is not included in the detection result, and (ii) a different landmark than the landmark intended to be detected is included in the detection result, cancel moving of the moving object.

* * * * *